Figure 1:
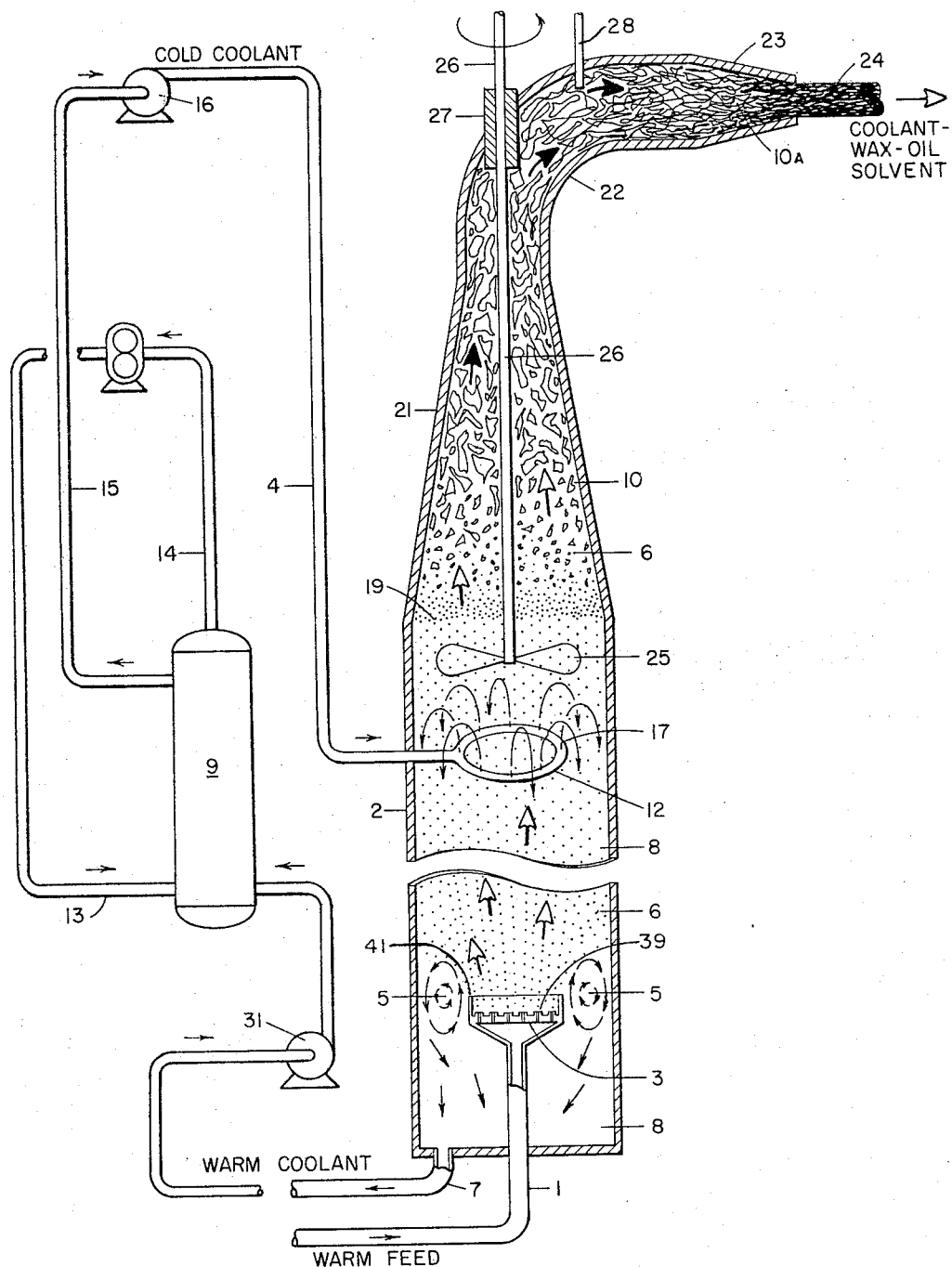

Leonard B. Torobin INVENTOR

BY Perry Carvellas

PATENT ATTORNEY

United States Patent Office 3,294,672
Patented Dec. 27, 1966

3,294,672
CRYSTALLIZATION PROCESS UTILIZING COMPRESSION OF THE CRYSTALLIZED MATERIAL
Leonard B. Torobin, Newark, N.J., assignor to Esso Research and Engineering Company, a corporation of Delaware
Filed Mar. 11, 1964, Ser. No. 350,957
12 Claims. (Cl. 208—37)

This application is a continuation-in-part of U.S. application Serial No. 348,508, filed February 28, 1964.

This invention relates to a process and apparatus for separating a crystallizable material from a liquid feed in which said material is soluble at certain temperatures and insoluble at lower temperatures. The liquid feed containing the crystallizable material in solution is introduced into a cooling tower as a dispersed phase of essentially uniform size droplets and contacted countercurrently with a continuous phase immiscible coolant whereby the feed is cooled and the crystallizable material in the dispersed phase is crystallized from solution.

This invention specifically relates to an improved process and apparatus for removing the dispersed phase crystallized material in mother liquor droplets from a countercurrent contacting tower through a constricted removal means. The tower is operated under positive pressure and said dispersed phase containing said crystallized material in said droplets is collapsed and compressed to form a continuous zone of material consisting essentially of crystallized material and mother liquor and a minimum amount of entrained coolant. The compressed droplets form a pressure seal against which the positive pressure in the tower acts to push said compressed material out of said tower. The rate of removal of said compressed material from the tower is controlled in part by the amount of pressure maintained in the contacting tower.

This invention also relates to a contacting tower wherein the continuous phase coolant is introduced into the tower at a point in the tower containing continuous phase coolant and the dispersed feed droplets.

Various attempts have been made to find a simple, efficient, and economic method for crystallizing material from their solutions. Efficient operation to date has, in most cases, been limited by the equipment and techniques developed which had either limited efficiency or limited throughput of feed material. A major problem encountered was to maintain the flow of the suspension of crystallized material in the mother liquor in the chilling apparatus at the low temperatures required to carry out the crystallization step. Another problem was the inability to handle the suspensions at crystallization temperatures below the pour point of the suspension.

In a process described by applicant recently, feed containing a crystallizable material is fed to a treating tower at a temperature above the crystallization temperature of the crystallizable material in the feed and contacted with an immiscible coolant. Feed enters the column either at the top or bottom of the column, depending on whether it is more dense or less dense than the coolant. The feed is introduced into the column as a dispersed spray of essentially uniform size droplets. The coolant is introduced into the opposite end of the column through an inlet means and forms a continuous liquid coolant phase and moves countercurrently to the dispersed droplets. The coolant is introduced into the tower at a temperature below the crystallization temperature of the crystallizable materials in the feed. By the time the relatively dense bed of droplets reaches the opposite end of the column from which they were introduced, a part of or substantially all of the crystallizable materials in the droplets can be crystallized or precipitated out of solution of the feed material.

This process has overcome the requirement in the prior art processes of maintaining the crystallized material-mother liquor suspension in a fluid condition during the crystallization step. Because the feed containing the crystallizable material is introduced as a dispersed phase, the fluidity needed in the system during the chilling and crystallization steps is provided by the continuous phase liquid coolant which is interspaced between each of the spray droplets containing the crystallized material.

The liquid-liquid contacting towers heretofore used had both expanded top and bottom sections in the region containing the inlet means to provide passage of the two immiscible liquids past the respective inlet means. Conventional towers, for example, where the feed was withdrawn from the top of the tower, had withdrawal means in the top of the tower for the crystallized material and mother liquor in which the dispersed phase collapsed and coalesced and overflowed a weir in the top of the tower. The collapsed material was then separated from the immiscible coolant phase and was removed from the tower. With this type of withdrawal means, regardless of the capacity of the tower to chill and crystallize the crystallizable material in the feed, the throughput of the tower was limited by the rate at which the collapsed dispersed phase could overflow the weir and be withdrawn from the top of the tower. The withdrawal rate in these towers was limited by the fluidity of the crystallized material-mother liquor suspension in the top of the tower. For example, if the final crystallization temperature was below the pour point of the crystallized material-mother liquor suspension, it would not flow and would plug the tower. Also, if the crystallized material was not removed from the tower at a sufficiently high rate, or the throughput was not limited to the rate at which the crystallizable material could be removed, a pinching effect at the top of the tower occurred which limited throughput of the feed. The pinching effect caused the dispersed phase droplet concentration to gradually increase in the top of the tower until the area of increased concentration backed down the tower and eventually stopped the tower up. The fluidity and pour point problems were more serious with some feeds than others. For example, with high angle of repose feeds, unless high solvent dilution ratios were used with the feed, the collapsed dispersed phase would set up and plug the tower. This would happen anytime the final crystallization temperature was below the pour point of the crystallized material-mother liquor suspension. With low angle of repose materials, the collapsed dispersed phase was generally more fluid and could be withdrawn providing that the crystallized material-mother liquor suspension was maintained above its pour point. An attempt to increase the feed throughput rate was made by operating the tower at positive pressure with a view towards pushing the collapsed dispersed phase out of the tower. This did not prove to be satisfactory with certain feeds because the collapsed dispersed phase crystalline materials frequently would bridge stopping movement of the solids and leaving openings through which coolant was pushed out of the tower under the pressure of the tower. Even where solids movement was obtained, this caused removal of very high concentrations of coolant phase with the collapsed dispersed phase which is undesirable. Also, if too much coolant is removed from the top of the tower, there will not be enough in the tower to maintain countercurrency and the operation of the tower will upset.

The addition of solvents directly with the dispersed phase feed frequently improved the throughput rates in that they reduced the pour point of the suspension and made the collapsed dispersed phase material more fluid and more easily removable from the top of the tower.

Another limiting factor to obtaining high feed throughput rates was the desirability of removing as much as possible of the entrained continuous phase coolant from the collapsed dispersed phase in the tower. The separation of the coolant from the collapsed dispersed phase by draining frequently required long residence times.

Crystalline waxy oil feeds could be handled by entraining large amounts of coolant and/or adding high dilution ratios of solvent and/or adding large amounts of crystal modifiers. Micro-crystalline waxy oil feeds were easier to handle but, due to the high viscosity of the dewaxed oil at the low dewaxing temperatures, high throughputs were not obtained without addition of solvents. The added solvents reduced the pour point of the slurry, increased the fluidity of the slurry, and made it more easily removable from the tower.

The expanded region in the end of the tower (in conventional contacting towers) in which the dispersed phase containing the crystallized material was coalesced or collapsed caused other operation problems. If the rising column of droplets is subjected to an expansion in the tower at either the bottom of the tower or at the top, there is obtained a non-uniform dispersion of droplets in the expanded regions. This gives rise to a hydrostatic column of droplets which is balanced by a column of continuous phase which is of different average density. The difference in density at a given elevation in the tower gives rise to gross recirculation of the droplets in the system which can cause (a) loss of countercurrency, (b) sufficiently high shear forces to cause the droplets to coalesce prematurely or break up, (c) deposition of droplets on the tower wall, and (d) the formation of coolant in feed in coolant droplets.

In the conventional towers, the coolant was frequently introduced in the top of the tower through an air space or introduced into the top of the tower in the coalesced dispersed phase. With easily collapsible materials, introduction of the coolant above the collapsed phase could result in the production of coolant in oil droplets which, when they enter the continuous coolant phase, form droplets of coolant surrounded by a thin film of feed in the continuous coolant phase. These droplets, because of their close density to the coolant, randomly float within the column and eventually disrupt countercurrent flow. These coolants in feed in coolant droplets are referred to as fish eggs. Also, introducing the coolant into the tower at high velocities can produce a high shear force around the dispersed phase droplets which can break up the droplets and form the coolant in feed in coolant droplets.

In accordance with the present invention, a countercurrent contacting tower having a gradual constriction at the end of the tower from which the collapsed phase is removed is used. The tower is operated at positive pressure. Feed is introduced into the tower as a dispersed spray of essentially uniform size droplets. The dispersed spray is made up of a relatively dense moving bed of droplets which move in the tower countercurrently to the continuous coolant phase. The continuous liquid coolant phase is introduced into the opposite end of the column through a suitable inlet means and moves countercurrently to the moving bed of droplets.

The coolant is introduced into the tower through a suitable inlet means at a point below (where coolant is the more dense) the interface between the collapsed dispersed phase and the dispersed phase and at a temperature below the crystallization temperature of the crystallizable material in the feed. At the cold end of the column, that is, the end at which the continuous coolant phase was introduced, the crystals of mother liquor are removed from the column together with a controlled amount of entrained continuous coolant phase. The removal means of the tower gradually contracts and is reduced in cross sectional area. The gradual contraction of the tower squeezes out entrained coolant. The collapsed dispersed phase is compressed to form a continuous zone of material consisting essentially of crystallized material and mother liquor which forms a pressure seal against which the positive pressure in the tower acts to push said compressed material out of said tower.

In the tower above the coolant inlet means there may be placed an impeller wheel that assists in compaction of the crystallized material and hastens the formation of the crystallized material continuous phase. The impeller also discourages the passage of coolant in feed in the coolant dispersions (fish eggs) down from the dispersed phase collapsing region into and past the coolant inlet region. The stirring of the impeller is critical since if it is too high it causes entrainment of excessive amounts of coolant in the collapsed phase at the top of the tower and, conversely, if it is too slow it takes too long to convert the dispersed phase into a collapsed phase. With easily coalescible material, a minimum amount of stirring is required, and with a difficultly collapsible material, a maximum amount is required.

The crystallized material-mother liquor suspension is removed through the constricted removal means from the tower and the precipitated solids separated from the mother liquod by filtration, centrifugation, or merely by gravity settling. The major portion of the coolant is removed from the opposite end of the column from which it is introduced and cooled by suitable means to its inlet temperature and recycled.

Applicant's apparatus and process provide an efficient, economical means whereby crystallizable material may be crystallized from solution in a dense dispersion by direct contact with an immiscible countercurrently flowing coolant. The throughput rate of the feed is no longer limited by the fluidity or the pour point of the crystallized material-mother liquor suspension or by the rate at which the crystalline material-mother liquor slurry can overflow a weir in the crystallized material removal means. In accordance with applicant's process, higher throughputs of crystallizable material can be obtained wherein the positive pressure of the cooling tower can act upon the collapsed dispersed phase of crystallizable material and remove it from the tower at higher rates. The production of fish eggs in the tower due to gross circulation in expanded areas in the top or bottom of the tower is prevented since the tower does not utilize expanded areas. The residence time required to drain entrained immiscible coolant from the collapsed crystallizable material-mother liquor phase is greatly reduced due to the squeezing effect and compression of the collapsed dispersed phase which tends to remove entrained coolant from the collapsed dispersed phase. The throughput rate of the tower is now independent of the viscosity, fluidity, and pour point of the collapsed dispersed phase in the tower and can be made to more nearly match the coolant and chilling capacity of the tower.

FIGURE 1 of the drawings is a diagrammatic elevational view of an immiscible cooling crystallization apparatus comprising a chilling tower for crystallizing crystallizable feed material, applicant's novel constricted removal means for crystallized material, and a means for cooling the immiscible coolant by vaporization of a volatile coolant. The drawing also illustrates a novel means for introducing the feed in the form of a dense dispersion of essentially uniform diameter droplets.

Figure 2:
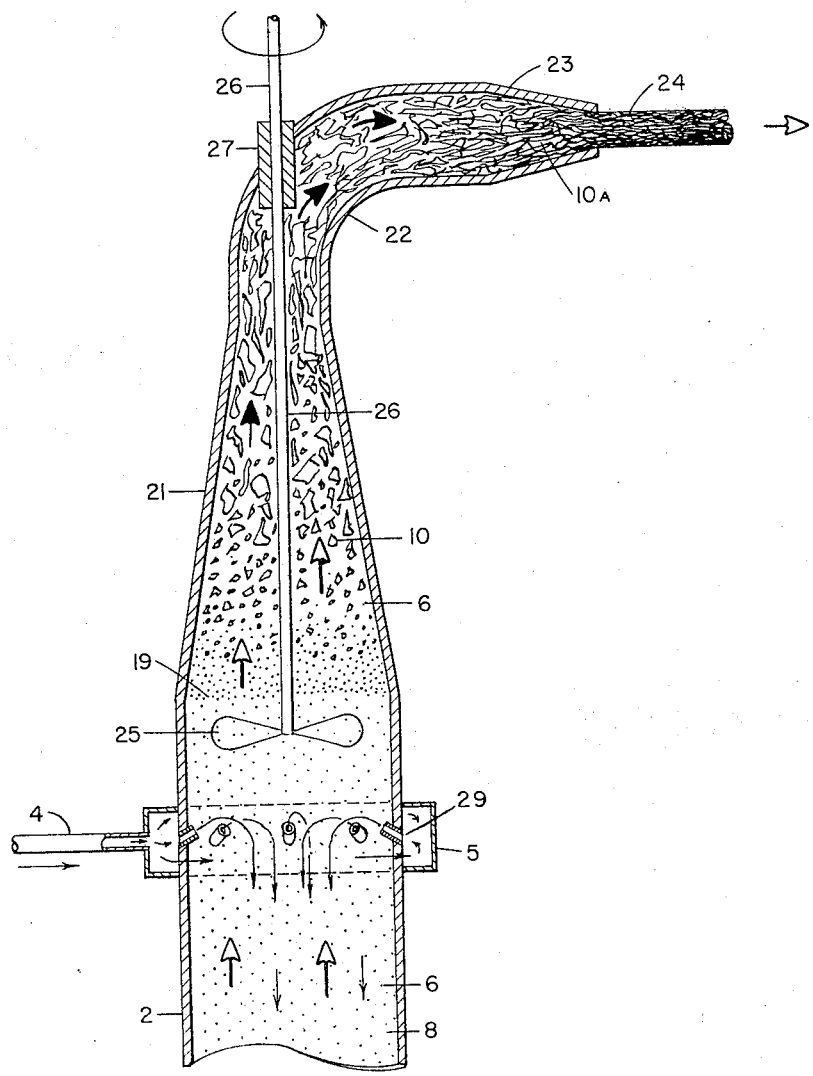

FIGURE 2 of the drawings is a diagrammatic elevational view illustrating an alternate means for introducing the continuous coolant phase in the top of the tower through an annular coolant introduction means.

The feed containing the material to be crystallized should remain fluid under the conditions of spraying in the tower. The crystallizable material should be, in most cases, completely dissolved in a feed prior to spraying. In order to prevent the formation of an emulsion or the entrainment of dispersed phase feed droplets in the coolant, there must be a sufficient density difference between the coolant and the feed so that the countercurrency is maintained by gravity flow. The density difference should exist even after the crystallizable material in the feed crystallizes in the feed droplets so that crystals in the mother liquor continue to flow countercurrent to the coolant.

The feeds that can be used in accordance with this process will include any feed in which there is a crystallizable material which can be separated from the feed on cooling the feed. Feeds will include chemicals, such as, benzene and paraxylene, as well as pharmaceutical chemicals. The process is especially applicable to crystallizing wax from hydrocarbon fractions, particularly distillate fractions and residual fractions. The distillate fractions generally have a boiling range below 900° F. and contain crystalline waxes. The crystalline wax materials are considered to be high angle of respose materials and heretofore have required high solvent dilution ratios to maintain fluidity of the wax-oil slurry during crystallization. Examples of crystalline feeds are Solvent 100 Neutral having a boiling range of 670–800° F. and a viscosity of 100 SSU @ 100° F., Solvent 450 Neutral having a boiling range of 800–950° F. and a viscosity of 450 SSU @ 100° F., and Barossa 56 having a boiling range of 820–970° F. and a viscosity of 500 SSU @ 100° F.

In addition to treating distillate feeds to remove crystalline wax material, residual feeds may be treated to remove micro-crystalline wax material. The residual feeds are generally referred to as boiling above 900° F. The residual feeds are considered to contain low angle of repose waxes and, though more viscous, are generally more easily handled in the dewaxing processes. With high boiling residual feed, the viscosity of the motor liquor may be sufficiently high at the low dewaxing temperature to impair the flow of the materials through the apparatus.

Typical residual hydrocarbon fractions which are treated to remove the wax are Bright Stock boiling in the range of 1050° F.+ and having a V.I. of 95–100, and Cylinder Oil boiling in the range of 1050° F.+ and a V.I. of 85–90.

The coolant used to cool dispersed phase is substantially immiscible with the feed. The density difference between the coolant and the feed should be sufficient to maintain countercurrency in the column under all conditions of operation. The coolant should be sufficiently fluid at the cooling temperatures used that the dispersed phase feed droplets move easily through the continuous cooling phase. Suitable coolants are water, oil fractions, pure chemicals, brines, liquid metals, and the like.

Suitable coolants for use in petroleum dewaxing are water, aqueous salt solutions, aqueous calcium chloride brine solutions, and the like. The concentration of salt in the water, for example, calcium chloride brine, can be adjusted to obtain the desired density of the coolant and to lower the freezing point of the coolant to the temperature at which the petroleum fraction is to be dewaxed.

Diluents or solvents may be added to the feed from which the material is to be crystallized in order to improve the viscosity of the feed being treated so that it may be more easily handled and/or to aid in the crystallization and separation of crystals from the feed. Solvents for the feed material can be added to the feed, as well as antisolvents for the materials to be crystallized to aid in the crystallization. Depending upon the particular feed being treated from which the materials are to be crystallized, solvents such as alcohols, glycols, ketones, aromatic hydrocarbons, water, low boiling aliphatic hydrocarbons, and the like, can be used. With particular reference to petroleum hydrocarbon dewaxing, solvents such as MEK, MEK/toluene, propane, butane, pentane, and hexane can be used. Solvents, though not required in the crystallization step, are required in the separation step to provide fluidity.

Applicant has unexpectedly found that by gradually compressing the collapsed dispersed phase in the collapsed dispersed phase removal means that the precipitated material can be gradually compressed to form a continuous zone of crystallized material and form a pressure seal in the removal means against which the positive pressure in the tower can act to push said compressed material out of the tower. By controlling the pressure in the tower and the feed input rate, the withdrawal rate of collapsed dispersed phase can be adjusted to approximate that of the maximum crystallization capacity of the tower. Unexpectedly high throughput rates can be obtained by this means relative to the throughput rates obtained by merely allowing the crystallized material-mother liquor collapsed phase to overflow and be removed from the tower. Further, normally feeds which would have a desirable final crystallization below the pour point of crystallized material-mother liquor slurry could heretofore not be handled except by employing high solvent dilution ratios. However, by using applicant's invention, these feeds can now easily be handled with minimum or no solvent. Applicant's apparatus and process also minimize the residence time required to drain entrained immiscible coolant from the collapsed dispersed phase in the tower. In addition, this invention prevents the bridging of crystallized material in the withdrawing means into a solid mass whereby entrained coolant would, under pressure, be forced through the bridged material out of the tower with the collapsed dispersed phase. By operating in accordance with applicant's invention, minimum solvent need be used in both the crystallization step and also need be added to the collapsed dispersed phase to provide fluidity for passage of the collapsed dispersed phase out of the tower. Also, the amount of entrained coolant which heretofore had been used to improve fluidity of the collapsed dispersed phase is not needed to assure the flow of the dispersed phase out of the tower. This is an advantage since, under certain conditions, excess entrained coolant has an adverse effect on the subsequent separation step.

In dewaxing petroleum hydrocarbon fractions, in a balanced system one volume of coolant can be used to cool about 2–3 volumes of feed, depending on the feed, the amount of solvent used, and the desired crystallization temperature. If the heat exchange between the coolant and feed were perfect and optimum volume holdup of dispersed phase were used, the outlet temperature of the oil would approximate the inlet temperature of the oil. Adjustment would have to be made, however, for the heat of crystallization which would make the approaches somewhat less than identical.

The feed to be crystallized can be introduced into the tower at a rate of 15–325 cu.ft./sq.ft. of column cross section per hour. Rates of 35–150 cu.ft./sq.ft./hour are preferred; however, rates of 25–250 cu.ft./sq.ft./hour can also be used. The relative rate at which the feed and coolant are fed to the tower will depend on the feed temperature, the coolant temperature, the final crystallization temperature desired, the effective height of the tower, and the volume holdup. Feed and coolant are introduced into the tower at a sufficient rate to provide the desired chill rate and desired temperature gradient between the coolant and the dispersed feed phase. Coolant is introduced to the tower at a rate of about 5–200 cu.ft./sq.ft. of column cross section per hour, though rates of 10–100 cu.ft./sq.ft. are preferred; however, rates of 10–150 cu.ft./sq.ft./hour can also be used.

After filling the column with the coolant, the feed containing a crystallizable material is introduced into the column through a spray inlet means which produces essentially uniform size droplets. Though it is preferred to operate with very narrow drop size distribution, efficient operations have been carried out where the drop size has varied between 10–30% from the average drop size diameter and efficient heat exchange was still obtained. However, for better results, this variation from the average size is preferred to be kept down to 10–20%. The size of the orifice holes of the spray head through which the feed is introduced is selected to produce the desired droplet size for the particular feed being treated. Orifice holes can be selected to produce drop sizes of ⅜ to 1/32" in diameter, more generally ⅜ to 1/20" in diameter, and preferably about ¼ to 1/24" in diameter. A sufficient number of orifices is provided in the spray head used to produce a sufficient amount of the drops of the desired size to obtain the desired feed throughput and volume holdup.

The major factor controlling the chill rate is the rise velocity of the droplets in the continuous phase. The rise velocity can be most directly controlled by controlling the volume holdup of dispersed phase droplets in the cooling tower. The volume holdup is determined by the rate of introduction of the dispersed phase in the bottom of the column. By withdrawing the dispersed phase more slowly than it is introduced, the tower will gradually fill with dispersed phase. High volume holdup provides slower chill rates, higher throughput, and generally more efficient heat transfer in the column. The volume holdup can be as low as 10% up to about 85%. Volume holdup of 15% up to less than 50% can be used. Preferably, the holdup is controlled between 35 and 60% because it is within this range that more efficient heat exchange is obtained. Volume holdup of 50 to 80%, as well as 65 to 77%, can also be used depending on the feed being treated.

The tower can be operated under conditions to produce chill rates between less than 1° per minute up to chill rates of 150° F. per minute and still obtain easily separable precipitated or crystalline materials. Depending on the feed, chill rates of more than 15° F./min., up to 150° F./min. can be used. Chill rates of 0.25 to 15° per minute, of ½ to 7° F. per minute and of 1–3° F. per minute can also be used. Preferably, the tower is operated in such a manner as to obtain chill rates of 30 to 100° F. per minute. The best chill rate to be used with a particular feed and coolant to obtain the best results will depend on the feed and coolant used.

The best temperature gradient for good crystal growth between the dispersed droplet in which the crystal is forming and the continuous coolant phase will also vary with the particular material being crystallized. It is found that a temperature difference of greater than 40° F. results in the formation of wax crystals which are difficult to separate from the mother liquor. However, this maximum upper limit of 40° F. would depend upon the particular type of material being treated. With some materials it may be a little lower, with others a little higher, and would vary somewhat with whether or not a solvent or crystal modifier were used with the feed material. A temperature gardient corresponding to a temperature difference of 0.5 to 30° F., more generally of 0.5 to 20° F., and preferably from 1–10° F. can be used. An efficient operation can be carried out by maintaining the maximum temperature difference between the continuous coolant phase and the dispersed phase of more than 10° F. up to 30° F.

The tower will be operated in such a manner as to obtain close temperature approaches at the top and bottom of the column to ensure efficient heat exchange and economy of operation. The temperature approach at the top of the column will be within the range of about 1–40° F., generally within the range of 1–30° F., and more generally of 1–10° F. A temperature approach at the top of 1–20° F. can also be used. In a balanced system, the temperature approach at the bottom of the column will also be in the range of 1–40° F., generally 1–30° F., and more generally 5–20° F. The temperature approach at the bottom can also be 1–10° F.

In introducing the continuous phase coolant to the countercurrent contacting tower, it is critical that the coolant introduction be made in the continuous coolant phase below the point at which the dispersed phase collapses and coalesces in the top of the tower. In addition, the coolant must be introduced at a velocity of less than 2 ft./sec. into the tower. If the coolant is introduced at a higher velocity than this, the shear force of the coolant as it comes into contact with dispersed phase droplets is sufficient to distort and break up the droplets and, in some cases, to form droplets of coolant surrounded by a film of liquid feed in the continuous coolant phase. These droplets are called fish eggs and can upset the tower.

The pressure at which the chilling operation is carried out will depend upon the particular feed being treated and a particular coolant being used. With volatile coolants, diluents, or feeds, the tower will be operated at higher pressures, e.g., up to 500 p.s.i.g. The tower will, however, generally be operated at positive pressures of 5–350 p.s.i.g., depending on the cooling capacity of the tower for a particular feed and depending on the fluidity of the crystallized material-mother liquor collapsed compressed phase. It is the positive pressure of the tower which ensures the removal rate of the collapsed dispersed phase at a sufficient rate to allow the operation of the tower at or near its maximum crystallization capacity. More generally, the tower will be operated at pressures of 15–150 p.s.i.g.

Crystals, crystal aggregates, or precipitate aggregates formed in the dispersed phase droplet from the chilling step are sufficiently large and sufficiently free of entrained mother liquor to obtain the desired separation of crystallizable material from mother liquor in the subsequent separation step.

Equipment used in accordance with the present invention, including the construction of the tower and the gradual constricted compressed dispersed phase withdrawal means, is simple, easy to operate, and inexpensive. A suitable tower or column containing no internal baffling and containing no expanded section at the top or bottom is used.

The chilling tower is operated at positive pressure and crystallized material-mother liquor slurry is forced out of the top of the tower by the positive pressure of the tower. The crystallized material-mother liquor withdrawal means is provided with a gradual contraction of the tower which squeezes out coolant to a point where essentially a continuous crystallized material plug is formed. The constriction at the top of the tower is gradual and is reduced to the size of the removal line going to the separation means.

The continuous coolant phase can be introduced into the tower by several means. The means illustrated in FIGURE 1 of the drawings is a circular ring positioned at a point below the interface between the continuous coolant phase and the collapsed phase, i.e., the point of sharp difference in concentration gradient between dispersed dispersed phase and collapsed dispersed phase. An alternate means for introducing coolant is a means illustrated in FIGURE 2 of the drawings wherein the coolant is introduced through openings in an annular ring surrounding the column, which openings communicate with the inside of the column and are pointed upward.

The invention may be better understood with reference to FIGURE 1 of the drawings which is described with reference to dewaxing a hydrocarbon feed. In order to obtain the desired degree of crystallization from a particular feed, the specific heat of the feed as well as of the coolant is calculated and the ratio of each required to carry out the desired chilling operation is determined. The desired pour point of the dewaxed oil will determine the minimum temperature required in the chilling tower. The coolant will be cooled to a temperature slightly below this temperature to obtain the desired crystallization of the feed and pour of dewaxed oil. The feed will be generally introduced at about ambient temperature and the difference between the feed input temperature and the minimum chilling temperature of the crystallization step will constitute the chilling range.

In a preferred embodiment of the present invention, a continuous phase coolant consisting of about a 28% calcium chloride brine solution is introduced into the top of the tower 2 through upward pointing orifice openings 17 on circular ring 12. The coolant is introduced through line 4 initially at about ambient temperature and is fed into the tower until the tower is completely filled with coolant. After the tower is filled with coolant, the petroleum hydrocarbon fraction containing 3 to 30 wt. percent wax, based on feed, is introduced into the tower at about ambient temperature through line 1 and through spray head orifice plate 3 containing protruding orifices 39. The spray head is surrounded by annular vertical baffle 41.

The feed is introduced into the tower at a temperature above its pour point, for example, 40 to 160° F. The annular baffle 41 is placed at the outer edge of spray head plate 3 and extends vertically upward from the outer edge of plate 3 for a distance of about ⅛ the spray head plate diameter. The baffle 41 deflects the standing vortex 5 of the continuous cooling phase outward and away from the vicinity of the spray head so that the said coolant phase passes downward through zone 8. As the dispersed phase is introduced into the tower, it displaces continuous coolant phase which is removed through the wax slurry outlet line 24. When the desired rate of introduction of the dispersed phase is reached, the coolant is again introduced into the top of the tower and withdrawn through coolant outlet line 7 at a rate sufficient to balance the system. Initially, during startup, the exit of coolant through line 24 is caused by the introduction of the feed liquid into the tower since room must be made for this liquid. Once countercurrency is established in the tower, the inlet temperature of the coolant is gradually reduced until the desired dewaxing temperature is reached. The wax in the feed is crystallized and the dispersed droplets concentrate in the top of the column and a sharp concentration gradient 19 is established between dispersed phase in continuous phase coolant and collapsed dispersed phase containing only a minor amount of entrained coolant. Excess coolant over that withdrawn through coolant outlet line 7 is introduced through line 4 to compensate for coolant entrained in the wax-oil slurry leaving with slurry through slurry outlet line 24.

The coolant can be introduced suitably at a temperature of −45° F. to +40° F., depending upon the particular feed being treated. The temperature approaches at both ends are within about 1 to 30° F. and sufficient dispersed phase is introduced to obtain a volume holdup of dispersed phase of about 30 to 60 vol. percent. Under these conditions, efficient heat exchange between coolant and dispersed phase is obtained.

The waxy oil feed introduced through spray plate 3 forms a dense dispersion of essentially uniform diameter droplets 6 of ⅜ to 1/20″ in diameter, which rise at a rate in the column of about 2 to 50 ft./min. The feed is introduced into the column at a rate of about 25 to 250 cu. ft./sq. ft. of column cross section per hour. The coolant is introduced at a ratio of about 1 part coolant to 2 to 2½ parts of petroleum fraction feed or about 10 to 150 cu. ft./sq. ft. of column cross section per hour. The continuous coolant phase countercurrently contacts the rising dense dispersion of oil droplets cooling them at a controlled rate of 30 to 80° F./min. while maintaining the temperature difference between the dispersed phase droplet and the coolant phase of between 1 and 30° F. As the oil droplets are cooled from their inlet temperature to the exit temperature in the top of the column, the wax present in the spray droplets crystallizes out of solution.

The upward movement of the dense dispersion of essentially uniform size waxy oil droplets is indicated by the open arrows while the downward countercurrent flow of the continuous coolant phase is indicated by the closed arrows. At the top of the tower the dispersed phase compresses and forms an essentially continuous collapsed phase of less dense material extending upward from the sharp concentration gradient 19 near the top of the tower to the top of the tower. As the inventory of the less dense material, in this case the wax-oil coolant slurry, builds up in column 2 it is collapsed and compressed in the constriction 21 and 23 at the top of column 2. In the drawing the collapsed, dispersed phase of the less dense material, that is, the wax-oil coolant slurry, is indicated by 10 and 10A.

An important feature in the operation of the tower is to control the residence time of the collapsed or compressed phase in the top of the tower to drain or squeeze out the major portion of any entrained coolant in the collapsed dispersed phase. Normally, when the oil-wax slurry is removed from the top of the tower, it will have varying amounts of occluded or entrained coolant in the slurry, depending on the feed treated and the residence time in the top of the tower. However, in accordance with applicant's improvement, the residence time required to remove a certain amount of entrained coolant will depend upon the impeller r.p.m. and the amount of compression of the wax-oil slurry. Compressing the slurry squeezes out entrained brine greatly reducing the residence time required to remove entrained coolant. The amount of coolant entrained and the residence time required, as well as the r.p.m. of the impeller required, will depend on the particular feed and the operation carried out.

Generally, the tower is operated in such a manner and the withdrawal rate of the slurry is controlled in such a manner that 1 to 20 vol. percent of occluded coolant is withdrawn with the crystallized wax and liquid oil. In the event that additional coolant is not added to make up for that withdrawn with the slurry, the sharp concentration gradient 19 between coolant and dispersed phase will gradually move down the column and the tower will upset and become inoperative. It was found that by using applicant's novel take-off means, even with a minimum of or no solvent in the feed and with suspensions of solids which were below their pour point, the crystallized material could be removed from the top of the tower and through line 24 without plugging the tower or removal means and/or stopping the operation of the tower.

The warm coolant is removed from the bottom of column 2 through line 7 and can be cooled by conventional means, such as by direct contact with a vaporizing auto-refrigerant or by indirect heat exchange. In accordance with one embodiment of the present invention, the coolant is removed through line 7 and is continuously fed to direct contact cooling vessel 9 via pump 31. In vessel 9 it is directly contacted with a cold liquid auto-refrigerant under pressure, such as propane, at a temperature of about −44° F. and at a pressure of about 0 p.s.i.g. The coolant and liquid auto-refrigerant are intimately mixed and the propane allowed to slowly vaporize at a controlled rate and the vapor is removed through line 14. Vaporization of the liquefied propane provides refrigeration, cooling the warm coolant from a temperature of about 65° F. to a temperature of about −35° F. Cold liquid coolant is removed through line 15 via pump 16 and is introduced into chilling column 2 through line 4.

Applicant's improvement in the immiscible countercurrent crystallization of crystallizable material from a feed introduced into a cooling tower as a dense dispersion is in means for removing the collapsed dispersed phase and, in addition, having essentially straight sides to the chilling tower with no expanded sections at either the top or the bottom of the tower. Constricted areas 21 and 23 of tower 2 in FIGURE 1 of the drawings provides the necessary gradual constriction to reduce the area of the tower from the tower diameter to the diameter of the withdrawal line 24. This constriction must be gradual or bridging of crystallized material and excess loss of coolant will occur. For example, the angle of the cone of area 21 can be equally between 5 and 60°. In this manner, the diameter of the withdrawal means is reduced to about 5–25% of the effective diameter of the tower.

Impeller 25 attached to shaft 26 aids in collapsing and compressing dispersed phase droplets 6 in the top of the tower. Shaft 26 enters cooling tower 2 by means of collar 27 in which shaft 26 is rotatably mounted. The inverted cone 21 and conical means 23 further compress the dispersed phase to form a plug of compressed dispersed phase 10 and 10A, forming a pressure seal in the top of the tower and allowing the positive pressure in the tower to act on this material to force it out of the tower.

line stock at a propane solvent dilution ratio to feed of 0.5.

The immiscible coolant consisted of 28 wt. percent calcium chloride brine solution. The cooling tower was fifteen inches in diameter and had an effective height of 60 ft.

The data obtained is reported in the table below.

|  | Conventional Top | | Conical Top | |
|---|---|---|---|---|
|  | Crystalline Feed | Micro-Crystalline Feed | Crystalline Feed | Micro-Crystalline Feed |
| Oil Plus Solvent Feed Rate, g.p.m. | ¹ 0.0 | ⁵ 0.0 | ¹ 34 | 34 | ⁵ 30 |
| Collant Rate, g.p.m. | 18.0 | 18.0 | 18.0 | 18.0 | 18.0 |
| Dilution Ratio | 0.5 | 0.5 | 1.0 | 0.5 | 0.5 |
| Pour Pt. of Feed, °F | 120 | 120 | 120+ | 120 | 120 |
| Pour Pt. of Dewaxed Oil, °F | | | ² 20 | ² 20 | ² 20 |
| Oil Content of Wax, Percent | | | ³ 35 | ³ 30 | ³ 30 |
| Pour Pt. of Wax Oil Slurry, °F | 65 | 50 | −10 | 65 | 50 |
| Final Crystallization Temp., °F | 8 | 12 | −3 | 8 | 12 |
| Percent Entrained Coolant | | | 18 | 21.4 | 20.3 |
| Tower Pressure, p.s.i.g. | ⁶ 500 | ⁶ 500 | 325 | 310 | 295 |

¹ The tower plugged and the operation had to be stopped 5–10 minutes after introducing the feed.
² Calculated pour point.
³ Calculated oil content, SBA at 0° F.
⁴ In this run the maximum capacity of the tower was about 34 g.p.m.
⁵ In this run the operation was limited by the maximum amount of oil feed available, and a higher throughput could have been handled had the oil feed been available.
⁶ These runs were started at a pressure of about 325 p.s.i.g. but due to plugging of the tower top the pressure rapidly built up in the tower to 500 p.s.i.g. and the operation was stopped The tower in this embodiment is operated at a positive pressure of 15–500 p.s.i.g., thereby providing the driving force for pushing out the crystallized product from the tower. This seal allows the positive pressure of the tower to work on the compressed dispersed phase forcing it out of the tower via outlet 22 and 24. With certain very viscous compressed materials, a diluent may be added through line 28 to further improve the fluidity of the material as well as to aid in the separation of the crystallized material from the mother liquor in a subsequent separation step. The important feature of applicant's invention is in the ability to handle suspensions of crystallized material in mother liquor at crystallization temperatures below the pour point temperature of the suspension.

FIGURE 2 of the drawings illustrates an alternate means for the introduction of the coolant into tower 2. In this alternate means, the only difference from FIGURE 1 is the annular ring 5 into which is introduced the continuous coolant phase. The inside of annular ring 5 communicates with the inside of tower 2 through communication means 29 which are upward point channels. Another alternate to using communication means 29 would be to have a continuous circular peripheral opening communicating means slanted upward through which the coolant could be introduced. This tower otherwise operates in the same manner as the tower described in FIGURE 1 of the drawings.

The invention may be better illustrated with reference to the accompanying example.

EXAMPLE

In order to illustrate the advantage of using applicant's novel collapsed dispersed phase technique and constricted withdrawal means, crystalline and micro-crystalline feeds were dewaxed in a crystallization tower having conventional withdrawal means, where the wax-oil slurry overflowed a weir, and in tower utilizing applicant's conical withdrawal means.

The crystalline feed used was Solvent 100N having a boiling range of about 670–800° F. and a viscosity of 100 SSU @ 100° F. The micro-crystalline feed used was Bright Stock boiling in the range of about 1050° F.+ and having a V.I. of 95–100.

The crystalline stock was run with propane solvent dilution ratios to feed of 0.5 and 1.0, and the micro-crystalline stock at a propane solvent dilution ratio to feed of 0.5.

The above comparative data clearly show the unexpected improvement in the dewaxing process obtained by carrying out the process in accordance with applicant's invention.

Using the conventional tower withdrawal means, it is seen that wax-oil slurries having final crystallization temperatures, e.g., 8 and 12° F., below the pour point of the wax-oil slurry, e.g., 65 and 50° F., respectively, cannot be handled at all due to plugging. When the feed was diluted with 1-to-1 propane and the pour point of the wax-oil slurry reduced to −10° F. and the final crystallization temperature was above this, i.e., −3° F., the feed could be handled in the tower.

With applicant's conical top it is clearly seen that feeds where the wax-oil slurry pour point was 65° F. and 50° F. could easily be handled at final crystallization temperature below the pour point of the slurry of 8° F. and 12° F.

Also, though the volume of oil plus solvent feed in both cases was about 30–34 g.p.m., a substantially higher throughput of oil feed is obtained in accordance with applicant's invention because of the lower solvent dilution ratio. That is, with a 1-to-1 solvent dilution, only 17 g.p.m. of oil feed is fed to the tower, whereas with a 0.5-to-1 solvent dilution about 20 to 21 g.p.m. of oil feed is fed to the tower. This represents an increase in oil feed throughput of about 23–24%. Also, as related to the amount of refrigeration required to cool a specific amount of oil feed, since nothing refrigeration-wise is gained by cooling solvent, about 23–24% savings in refrigeration requirements is realized.

The above submitted data clearly illustrate the improvement in feed throughput rate obtained by utilizing applicant's technique of collapsing and compressing the dispersed phase droplets and utilizing the positive pressure in the tower to push the wax-oil slurry out of the tower.

This invention can be applied to the separation of crystallizable materials from various feeds containing crystallizable materials using various suitable immiscible coolants. The critical feature of this invention is in providing a constricted collapsed dispersed phase removal means whereby the dispersed phase containing the crystallized material in mother liquor is collapsed and compressed and the compressed dispersed phase forms a plug and pressure seal against which the positive pressure of the tower can operate to push the material out of the tower.

The invention is not to be limited by the above example but only by the scope of the appended claims.

What is claimed is:

1. A process for crystallizing a crystallizable material from a feed liquid in which said material is soluble at certain temperatures and insoluble at lower temperatures, at which lower temperatures said material is crystallized from its solution, wherein the liquid containing the crystallizable material is cooled from the feed temperature to the desired crystallization temperature by countercurrent contact in a tower with a continuous phase liquid immiscible coolant of different density than the solution containing the material to be crystallized, and wherein the liquid containing the crystallizable material is introduced into the coolant phase in the form of a dense dispersion of essentially uniform size droplets, said dispersed phase collecting and collapsing at the opposite end of the tower from where it was introduced to form a substantially continuous collapsed phase of crystallized material and mother liquor forming a sharp concentration gradient between the collapsed phase and the dispersed phase, gradually compressing the collapsed phase in a constricted area of the tower to form a plug and pressure seal of essentially continuous collapsed phase material, and removing said collapsed phase from said tower.

2. A process for crystallizing a crystallizable material from a liquid in which said material is soluble at certain temperatures and insoluble at lower temperatures, wherein the liquid containing the crystallizable material is introduced into one end of the tower at a temperature at which the crystallizable material is soluble in the form of a dispersion of essentially uniform diameter droplets which are contacted countercurrently with an immiscible continuous phase coolant of different density introduced at the opposite end of the tower at a temperature sufficiently cold to gradually lower the temperature of the dispersed feed phase to a temperature at which the crystallizable material crystallizes from solution within each of the dispersed droplets, said dispersed phase collecting and collapsing at the end of the tower opposite to which it was fed to form a substantially continuous phase of collapsed dispersed material and forming a sharp concentration gradient between the collapsed phase and the dispersed phase, wherein said tower is operated at a positive pressure and said dispersed phase containing said crystallized material in said droplets is gradually compressed in said tower to form a continuous zone of material consisting essentially of collapsed dispersed phase crystallized material and mother liquor which collapsed phase forms a pressure seal against which the positive pressure in the tower acts to push said compressed material out of said tower.

3. The process for dewaxing a petroleum hydrocarbon fraction comprising countercurrently contacting said fraction with a denser immiscible coolant, said coolant being introduced at a temperature below the wax crystallization temperature of said feed, the feed being introduced into the bottom of said tower at a temperature above its wax crystallization temperature in the form of a dense dispersion of essentially uniform diameter droplets which rise in the tower countercurrently to the descending continuous phase coolant whereby the dispersed phase feed is gradually cooled from its feed temperature to the wax crystallization temperature by direct contact with the coolant, growing wax crystals under controlled conditions within each of said droplets, said dispersed phase collecting at the top of the tower and collapsing and compressing to form a substantially continuous phase of collapsed dispersed material forming a sharp concentration gradient between the collapsed phase and the dispersed phase, gradually compressing the collapsed dispersed phase, said tower being operated under positive pressure and said dispersed phase being compressed into a continuous zone of material consisting essentially of crystallized wax material and mother liquor forming a pressure seal against which the positive pressure in the tower acts to push said compressed material out of said tower.

4. The process of claim 3 wherein the feed comprises a crystalline waxy oil feed.

5. The process of claim 3 wherein the feed comprises a micro-crystalline waxy oil feed.

6. The process of claim 3 wherein the tower is operated at a pressure of 5 to 350 p.s.i.g.

7. A process for dewaxing a petroleum hydrocarbon fraction comprising countercurrently contacting said hydrocarbon fraction with an immiscible coolant in a tower, said coolant being introduced at a temperature below the crystallization temperature of the feed of $-40$ to $+63°$ F., said hydrocarbon fraction being introduced at a temperature above the crystallization temperature of the feed of 70–120° F. as a dense dispersion of essentially uniform diameter droplets, which droplets are gradually cooled to the crystallization temperature of the wax in the dispersed droplets and the wax is crystallized in the droplets, wherein said tower is operated under positive pressure and said dispersed phase containing said crystallized wax and dewaxed oil are collapsed and gradually compressed to form a continuous zone of material consisting essentially of crystallized wax and dewaxed oil forming a pressure seal against which the positive pressure in the tower acts to push said compressed material out of said tower.

8. The process of claim 7 wherein the coolant is introduced at a velocity of less than two feet per second.

9. The process of claim 7 wherein the coolant is introduced at a point below the interface formed between the collapsed dispersed phase and the dispersed phase.

10. The process of claim 7 wherein the dispersed phase is collapsed by the motion of an impeller wheel which moves the dispersed phase upward.

11. The process of claim 7 wherein the dispersed phase is collapsed and gradually forced into a constricted area 5 to 25% of the effective diameter of the tower.

12. The process of claim 7 wherein the dispersed phase moves essentially upward and the average concentration of the dispersed phase in coolant remains essentially the same in the upper region of the tower.

References Cited by the Examiner
UNITED STATES PATENTS

| | | | |
|---|---|---|---|
| 271,080 | 1/1883 | Kells | 208—37 |
| 2,005,988 | 6/1935 | Brown | 208—37 |
| 2,301,965 | 11/1942 | Mauro et al. | 208—30 |
| 3,067,125 | 12/1962 | Kemp | 208—37 |
| 3,083,154 | 3/1963 | Gersic et al. | 208—38 |
| 3,178,899 | 4/1965 | Torobin et al. | 62—58 |

FOREIGN PATENTS

| | | |
|---|---|---|
| 353,392 | 7/1931 | Great Britain. |

DANIEL E. WYMAN, *Primary Examiner.*

P. E. KONOPKA, *Assistant Examiner.*